I. F. TAYLOR.
APPARATUS FOR STORING SHIPS' BOATS AND FACILITATING THE LOWERING OF SAME.
APPLICATION FILED AUG. 31, 1914.

1,240,100.

Patented Sept. 11, 1917.
7 SHEETS—SHEET 1.

WITNESSES

INVENTOR
Isaac F. Taylor
BY
ATTORNEYS

I. F. TAYLOR.
APPARATUS FOR STORING SHIPS' BOATS AND FACILITATING THE LOWERING OF SAME.
APPLICATION FILED AUG. 31, 1914.

1,240,100.

Patented Sept. 11, 1917.
7 SHEETS—SHEET 2.

I. F. TAYLOR.
APPARATUS FOR STORING SHIPS' BOATS AND FACILITATING THE LOWERING OF SAME.
APPLICATION FILED AUG. 31, 1914.

1,240,100.

Patented Sept. 11, 1917.
7 SHEETS—SHEET 4.

Witnesses
H. Woodard
C. Ullunku

Inventor.
Isaac F. Taylor
By H. Bewilson & Co
Attorneys

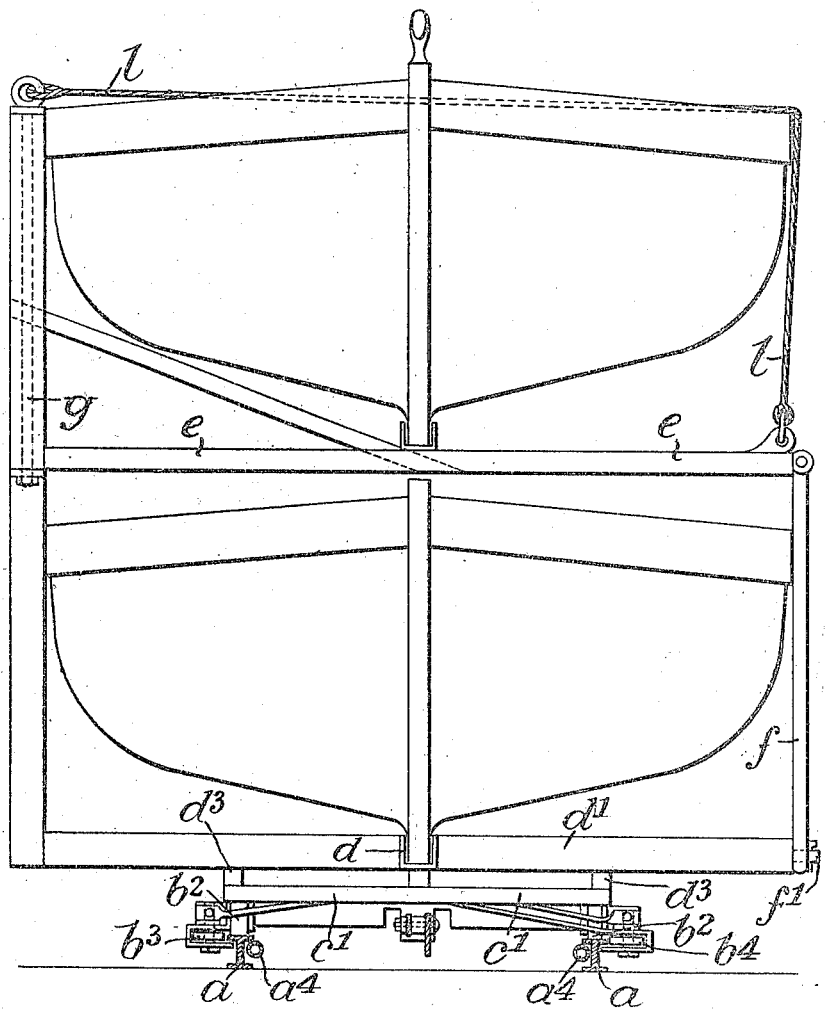

I. F. TAYLOR.
APPARATUS FOR STORING SHIPS' BOATS AND FACILITATING THE LOWERING OF SAME.
APPLICATION FILED AUG. 31, 1914.
1,240,100.
Patented Sept. 11, 1917.
7 SHEETS—SHEET 6.
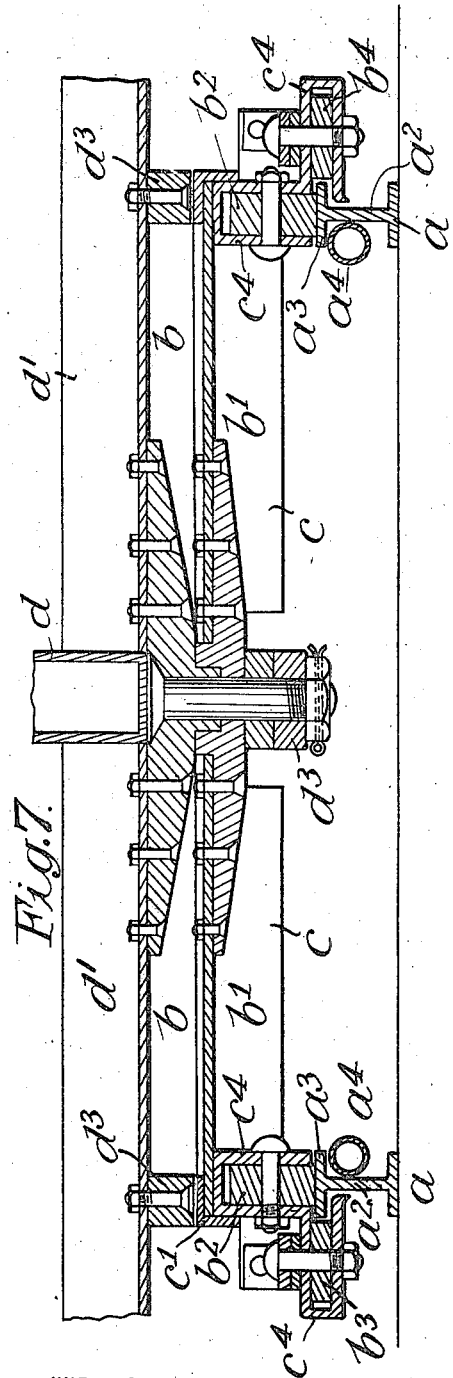
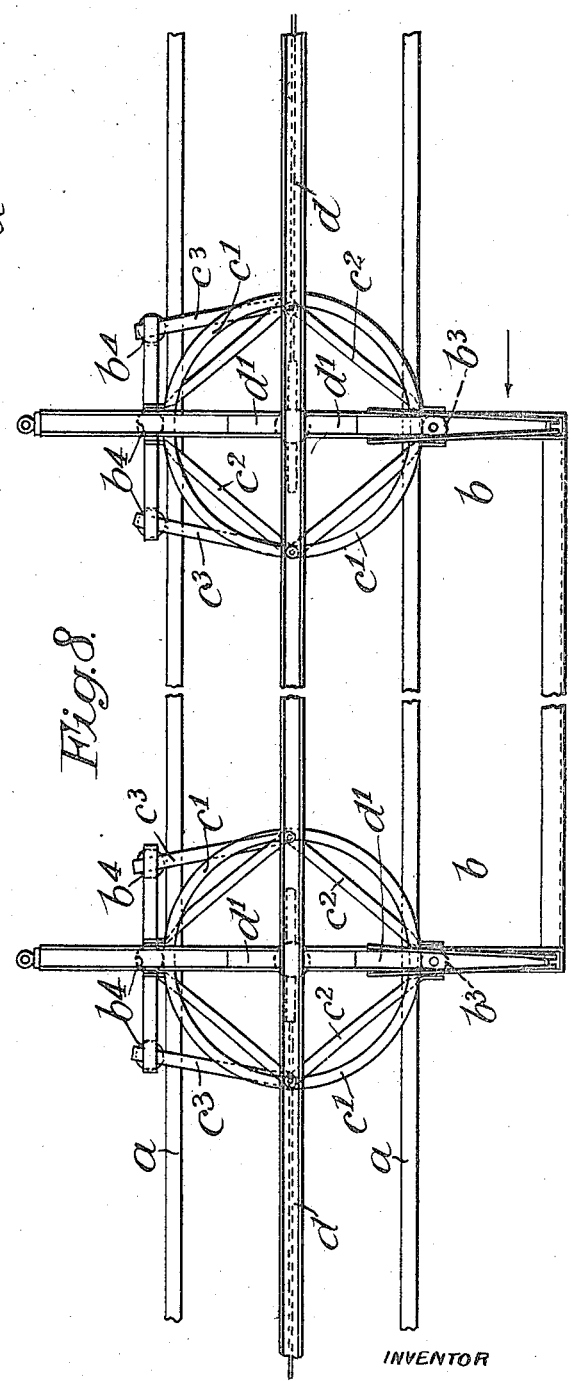
WITNESSES
H. Woodard
INVENTOR
Isaac F. Taylor
BY
ATTORNEYS

UNITED STATES PATENT OFFICE.

ISAAC FRANCIS TAYLOR, OF EAST DULWICH, LONDON, ENGLAND, ASSIGNOR OF ONE-HALF TO SAMUEL PICK, OF LONDON, ENGLAND.

APPARATUS FOR STORING SHIPS' BOATS AND FACILITATING THE LOWERING OF SAME.

1,240,100.                 Specification of Letters Patent.      Patented Sept. 11, 1917.

Application filed August 31, 1914. Serial No. 859,428.

*To all whom it may concern:*

Be it known that I, ISAAC FRANCIS TAYLOR, engineer, a subject of the King of Great Britain and Ireland, residing at 5 Upland road, East Dulwich, London, S. E., England, have invented certain new and useful Improvements in Apparatus for Storing Ships' Boats and Facilitating the Lowering of Same, of which the following is a specification.

This invention has for its object to enable boats to be stored or stowed on ships in such a manner that they can be quickly lowered by the davits or launching apparatus simultaneously from both sides of the ship or the whole of the boats be readily brought into position for lowering on either side of the ship, so that all boats can be lowered even when the weather conditions are such that launching can only be safely affected from one side of the ship.

Other objects are to enable the boats to be launched with safety and generally to enable the lowering or raising as well as the trimming of the boat to be effected and controlled with greater ease and facility than heretofore.

According to this invention a track is arranged around or partly around the boat deck and coupled trolleys are mounted to run on the track each trolley being constructed to carry one or more boats. Ropes or chains are carried around the track in opposite directions on guide pulleys or rollers to winch or like winding barrels by which means the trolleys can be caused to travel over the track and in the case of an endless track entirely around the track in either direction, one hauling rope being unwound as the other is wound up on its barrel. Means are also provided for locking the winding barrels against rotation to hold the trolleys stationary, or for locking the trolleys independently.

The lowering and raising of the boats is controlled by a winch comprising a pair of winch barrels with brake drums and one feature of the present improvements consists in gearing the barrels together in such manner that they can be rotated simultaneously at the same rate to wind up or pay out the falls as required or readily disconnected and allowed to rotate at different speeds under the control of the drums when the boat is being lowered to trim the boat. The winch coöperates with davits of the pivoted cantaliver type as set forth in our prior British patent specification No. 22242/12, and the present invention also comprises improved means whereby the cantalivers are automatically swung outward by the pull of the falls at the beginning of the boat lowering operation, and improved means for locking the cantalivers in their outboard position.

Our invention also provides collapsible guides for guiding the boats down the ship's side during the lowering of same.

In the accompanying drawings:—

Fig. 6 is an end view of one of the boat carrying trolleys showing two boats in position on the trolley.

Fig. 7 is a transverse section of the trolley, on a larger scale.

Fig. 8 is a plan of a trolley.

Figure 1:
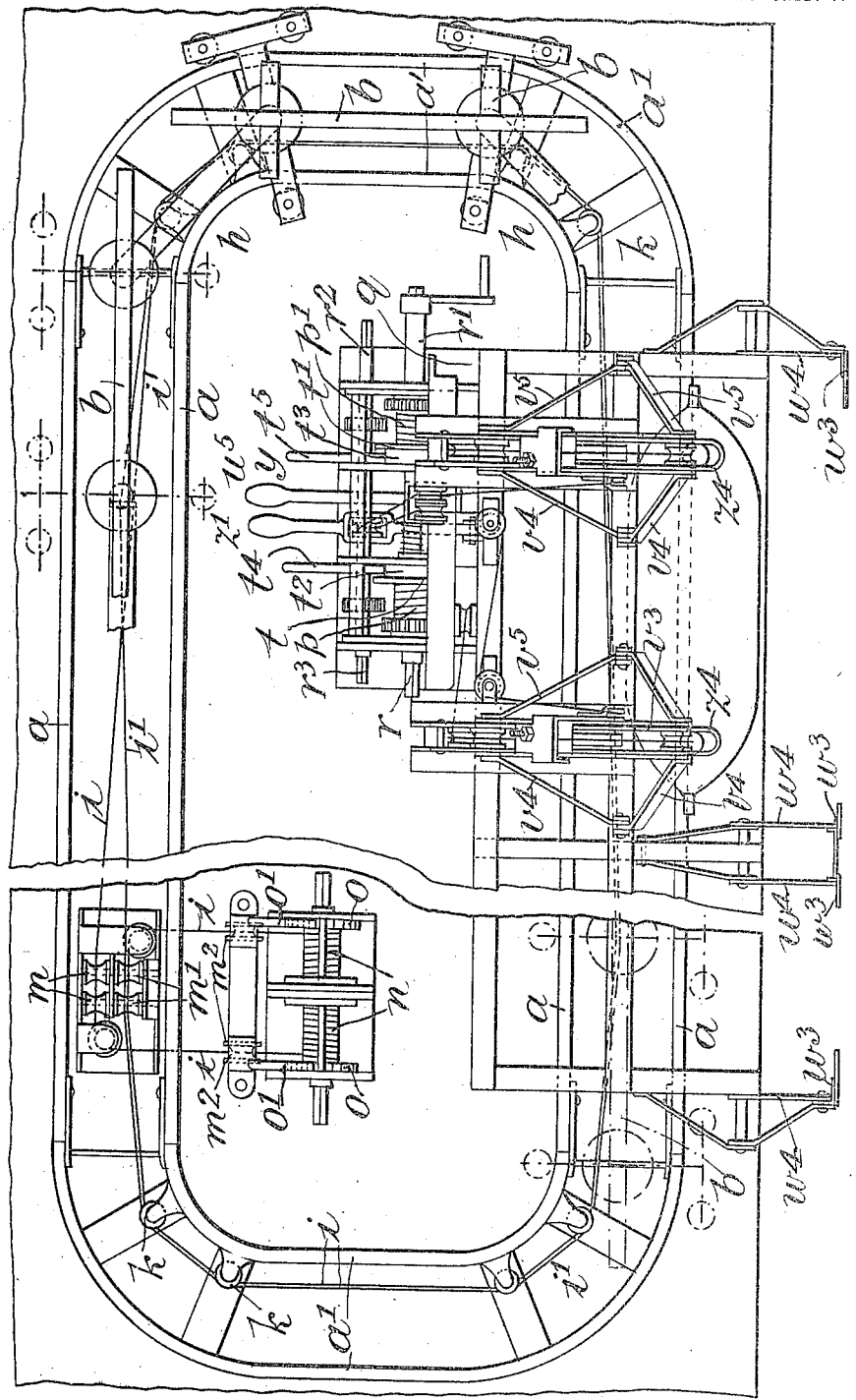
Figure 1 is a plan of boat storing and launching apparatus constructed according to this invention.

As shown the track is composed of parallel rails $a$, the end or other sections $a'$ of the track being hinged or detachable if desired so as to be capable of being raised or removed to afford access to hatchways or the like where necessary. Each rail has a vertical web portion $a^2$ and a horizontal tread portion $a^3$ which is embraced by swiveling underframe members $b'$ on the trolleys $b$ which hold the trolleys in position laterally and vertically on the rails. If desired heating pipes $a^4$ may be run alongside the track to prevent freezing of water on the track in cold latitudes.

Each trolley comprises as shown in Figs.

7 and 8 a pair of swiveling frame members or carriers $b'$ provided with rollers or wheels $b^2$ which run on the rails $a$ and lateral guide rollers $b^3$, $b^4$ which bear against the edges of the rail treads. The swiveling frame members $b'$ are constructed of inverted channel iron transverse members $c$, circular swiveling plates $c'$ of angle iron and stays or brace members $c^2$, $c^3$ connected with the plate $c'$ and bearing members $c^4$ in which the wheels and guide rollers $b^2$, $b^3$, $b^4$ are mounted. Horizontal extensions on the lower ends of the bearing member $c^4$ project under the rail treads and thereby prevent the trolleys leaving the rails. A single lateral guide roller $b^3$ bears against the inner side of the track to facilitate the running of the trolley around curves, but acting on the outer rail there are three lateral guide rollers $b^4$ which insure the proper guiding of the swiveling carriers. The upper parts of the trolleys form chocks for the boats and are constructed of longitudinal and transverse channel iron members $d$, $d'$ connected by a central swivel bolt $d^2$ with the underframe and provided with shoes or blocks $d^3$ to slide on the plate $c'$ or with rollers, and where it is desired to support two or more boats one above another, swiveling or movable arms $e$ forming chocks are supported at different heights by hinged bars $f$ on the arms which pass over pins $f'$ on the trolley frame and are secured by cotters in such a manner that after the uppermost boat has been launched from a trolley, the arms or chocks $e$ can be released by releasing the hinged bars, enabling the arms $e$ to be swung out of the way about vertical pivots $g$ on the fixed supporting frame, so that the next boat below can be launched and so on. As illustrated the upper boat is secured by a rope $l$ secured at one end to an eye on the pivot $g$ and at the other end to an eye on the arm $e$.

Two or more trolleys are preferably connected together by coupling bars $h$ which conveniently pivot about the same vertical axes as the swiveling frame members hereinbefore referred to.

The hauling cables $i$ or the like are coupled to the pivot bolt $d^2$ of one of the trolleys by coupling eyes or lugs $j$ as shown in Figs. 9 to 12 and pass between the track rails in opposite directions over suitable guide pulleys $k$, and guide rollers $m$, $m'$ by which they are led over other pulleys $m^2$ to barrels or drums $n$ provided with winding cranks or other hand or power driven gear for winding the cables on the barrels. Ratchet teeth $o$ are provided on the barrels with which pawls $o'$ can be engaged to prevent rotation of the barrels in the unwinding direction and thus hold the trolleys in any position on the track which they may be required to occupy.

Figure 9:
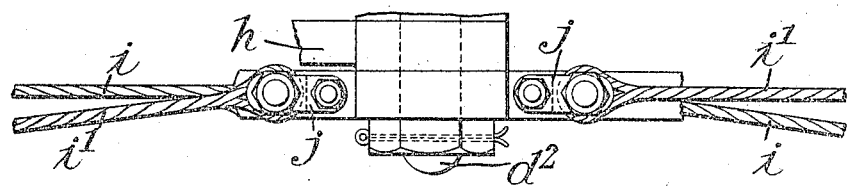
Figs. 9 and 10 are a detail elevation and plan respectively of double rope couplings for connecting the hauling ropes to the trolleys.
Figure 10:
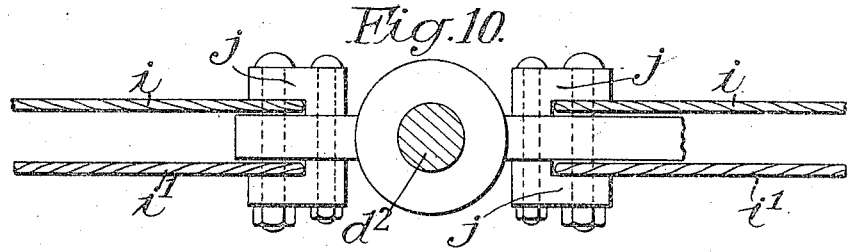
Figure 11:
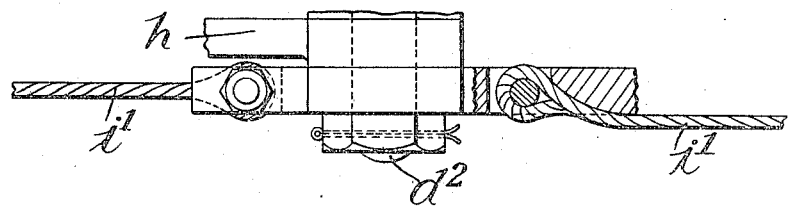
Figs. 11 and 12 are similar views of single rope couplings.
Figure 12:
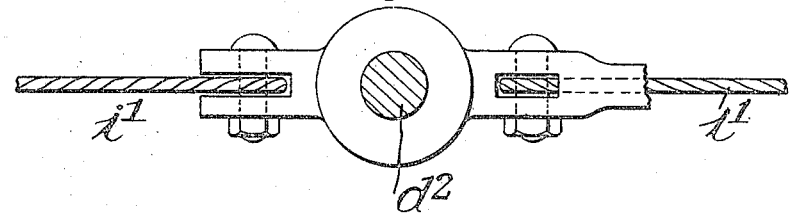

It will be seen that when moving the trolleys on the track in either direction one of the hauling cables will be wound up on one winch barrel while the other is unwound from the other barrel. Any number of trolleys may be connected at any part of the track to a cable $i'$ passing around the track and attached to one of the trolleys at the same point as the winch cables. For this purpose a double coupling lug is provided as shown in Figs. 9 and 10, for the connection of the two cables, and a single coupling as shown in Figs. 11 and 12 where it is only necessary to attach a single cable.

Figure 4:
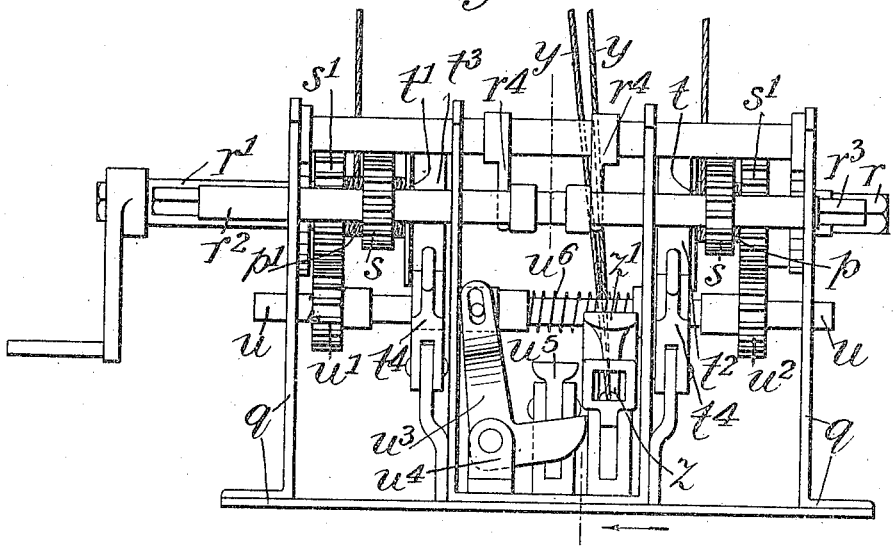
Fig. 4 is a side elevation of a double barreled winch provided with controlling gear in accordance with this invention.

As illustrated in Figs. 1 and 4 the winch barrels $p$, $p'$ which effect the lowering or raising of the boats are mounted in a suitable frame $q$ with their axes in line and actuated by independent shafts $r$ $r'$ each provided with a crank or other means of directly applying manual power to the shafts.

Hand operated counter-shafts $r^2$ $r^3$ are also provided for applying power to the winches and geared with the winch barrels by spur gearing $s$ $s'$. Any suitable motive power may also be employed to operate the winches as an auxiliary to the manual power. The shafts $r^2$ $r^3$ are mounted to slide longitudinally in the winch frame to enable their spur wheels $s$ to be moved out of gear with the winch barrels when desired in which position they are held by suitable catches $r^4$ engaging collars on the shafts.

These shafts may also be actuated through worm gear, in which case a worm wheel would be mounted on the shaft and driven by a worm spindle operated by hand or power. The parts of the shafts on which the worm wheels are mounted are made square or provided with a feather and adapted to slide in the worm wheels so that the shafts can be moved longitudinally to put their spur wheels out of gear as aforesaid, suitable bearing collars being mounted on the shaft on opposite sides of the worm wheel to take the thrust of the worm and provided with roller or ball races. Brake drums $t$ $t'$ are arranged on the ends of the winch barrels, and are acted upon by brake bands $t^2$ $t^3$ operated by foot levers $t^4$ $t^5$ to control the lowering of the boats.

In addition to the actuating shafts aforesaid another shaft $u$ is provided in the winch frame which carries a pair of spur wheels $u'$ $u^2$ adapted to be put in mesh with the spur gear wheels $s'$ on the winch barrels to gear the barrels together or to be moved out of gear therewith leaving the barrels free to rotate independently under the control of the cranks or brake drums to pay out the falls according to the trim to be given to the boat. For this purpose the shaft $u$ carrying the spur wheels is mounted to slide longitudinally in the winch frame and is moved in one direction by an angle lever $u^3$ pivoted in a bracket $u^4$ and actuated in one direction by a foot lever $u^5$ and in the opposite direction by a spring $u^6$ which normally maintains the shaft in gear.

Figure 5:
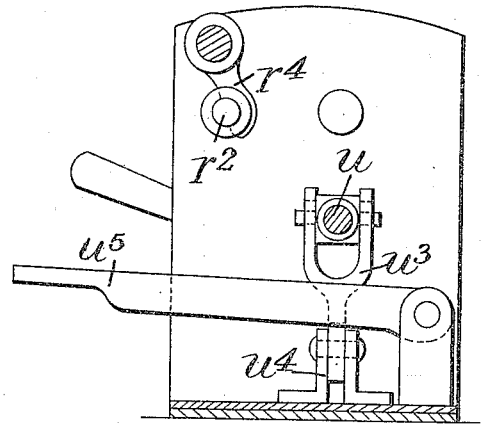
Fig. 5 is a transverse section showing certain details of the controlling gear.

As shown in Fig. 5 the lever $u^3$ has a forked arm which has a pin and slot connection with a collar or block on the shaft $u$.

If desired the lowering and trimming of the boats may be controlled from a bridge built over the gantry or framing on which the davits are supported. In this case the foot levers controlling the winches would be replaced by suitable levers, and rodding or other connections leading to hand levers or foot levers or both on the bridge. This arrangement would enable the operator to have an unobstructed view of the boat while the same was being lowered.

Figure 2:
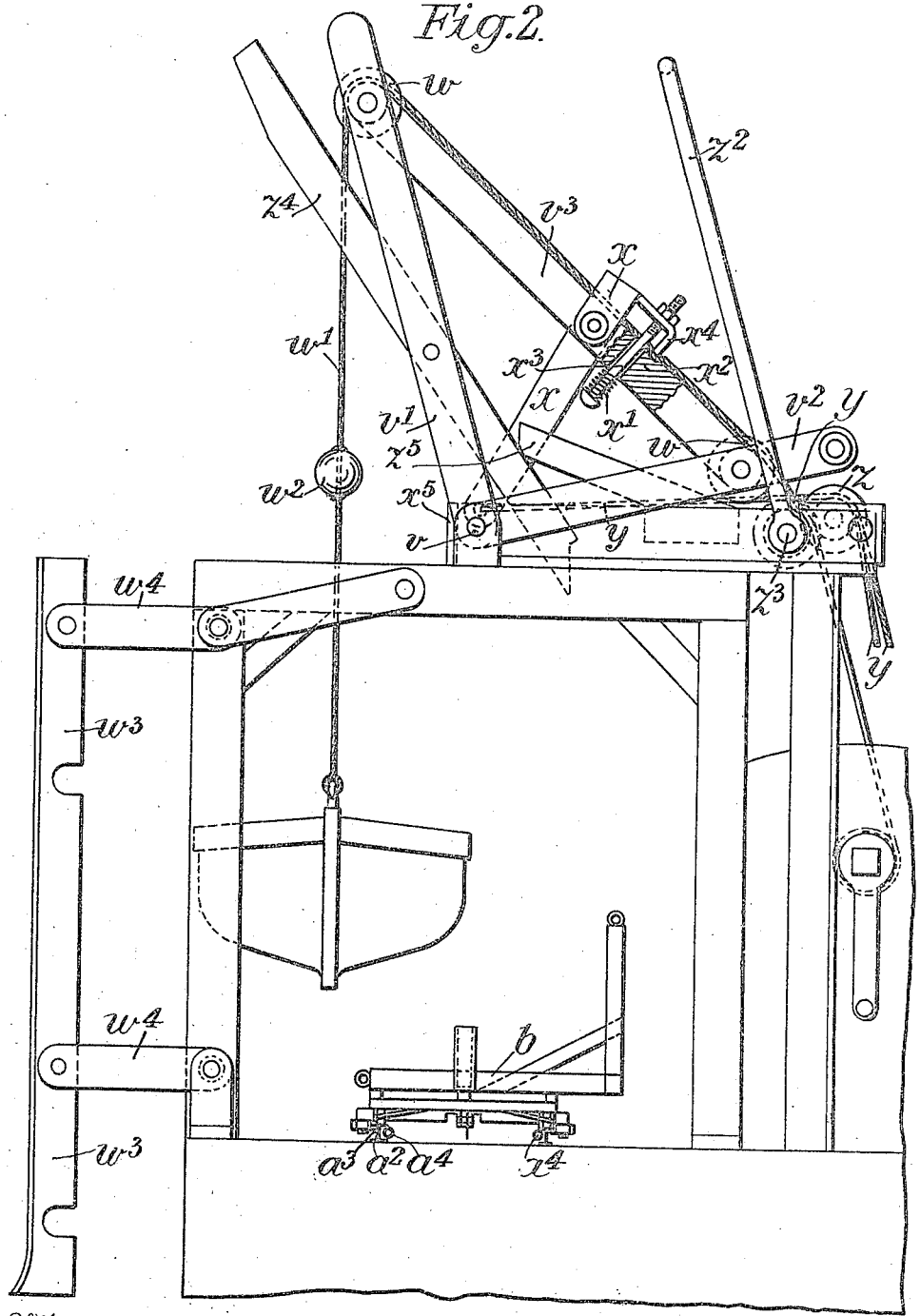
Figs. 2 and 3 are side elevations on a larger scale of the davits and launching tackle shown in the inboard and outboard positions respectively.
Figure 3:
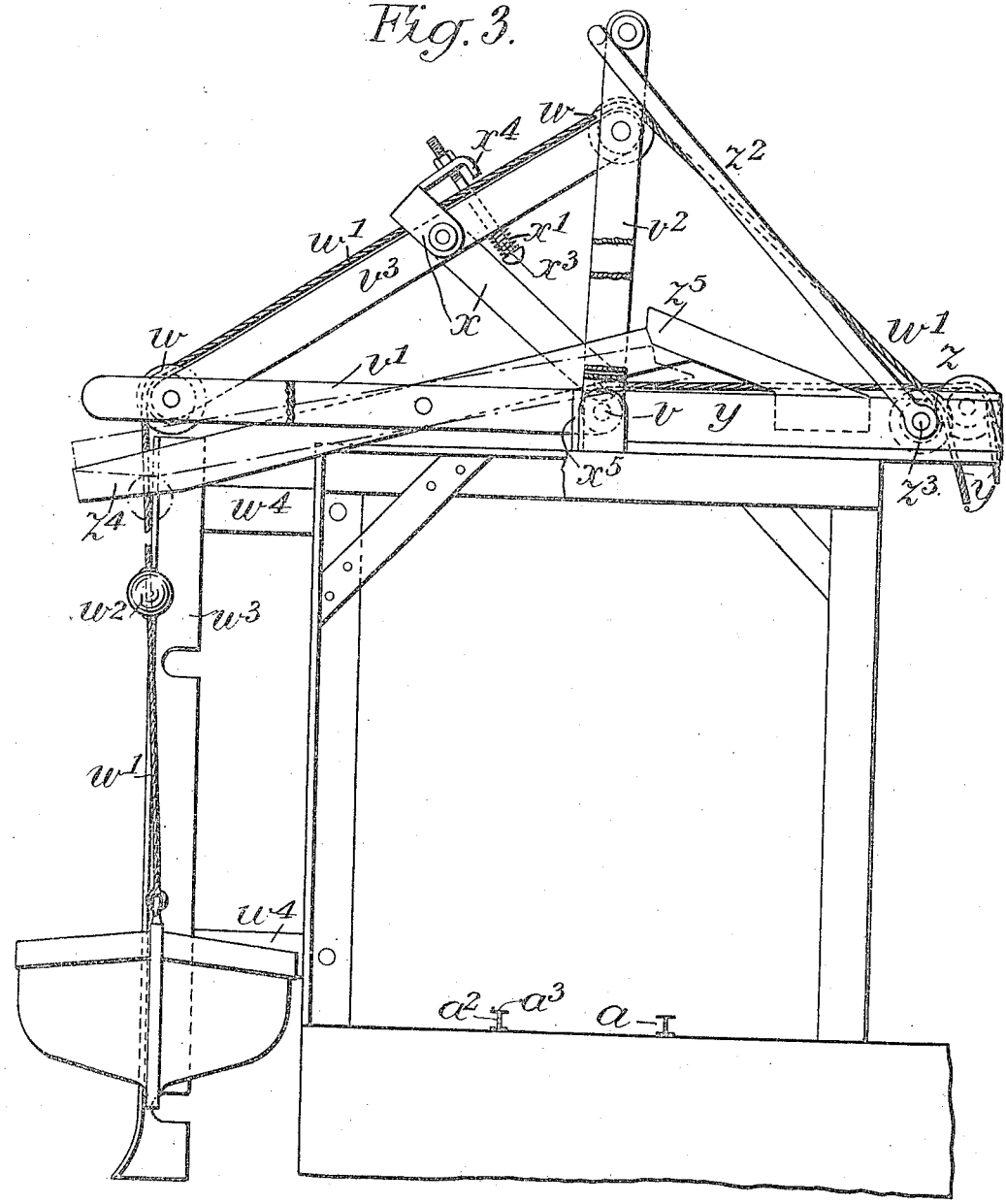

The davits which as clearly illustrated in Figs. 1, 2 and 3 consist of stayed or braced structures of right angled triangular form, are pivoted at $v$ to a suitable framing which extends over the track $a$ on the boat deck and comprise the two main members $v'$ $v^2$ connected at right angles by the stay $v^3$ and the inclined braces $v^4$ $v^5$. Pulleys $w$ are mounted on the davits and framing over which the falls $w'$ are guided to the winch barrels. Means are also provided on the davits for clamping the falls $w'$ to the davit when the davit moves in from the outboard position consisting of angle levers $x$ pivoted to the bracing members or stays $v^3$ of the davits and adapted under the action of suitable springs $x'$ to clamp the falls against the blocks $x^2$ fixed to the stays $v^3$. As shown the springs $x'$ are mounted under the blocks on headed rods $x^3$ which pass through suitably shaped clamping jaws $x^4$ formed on the ends of the levers $x$. As the davits move into the outboard position these clamping levers are released by their longer arms coming against fixed stops $x^5$.

The clamping levers $x$ are also connected by cords, chains or the like $y$ passing over pulleys $z$ with a foot lever $z'$ adapted to release the clamping levers at will when it is desired to raise or lower the falls without actuating the davits.

By clamping the falls to the davits as described the pull on the falls as they are first paid out from the winches to lower the boat will be transferred to the davit structures to swing them about their pivots into the outboard position in which position they are held by links $z^2$ which engage the davits and form tension stays said links being pivotally connected at $z^3$ to the fixed framing on which the davits are supported. Levers $z^4$ are also pivoted on arms or members $v'$ of the davits which tilt when the davits reach the outboard position so that their inner ends engage fixed stops $x^5$ on the davit support and prevent the davits being raised again until the locking levers are released. The release is effected when the falls $w'$ are wound up to a given height, by weights or balls $w^2$ which engage the locking levers $z^4$ and raise their outer ends so that the inner ends of the levers are depressed out of engagement with the stops $z^5$.

In order to guide the boats when being launched from or raised to the boat deck, angular guide bars $w^3$ are mounted vertically on pivoted links $w^4$ connected with the davit stand or framing and depend down the ship's side a suitable distance, said bars being suitably spaced apart to engage the boats at the stem and stern. When not in use the guide bars are capable of being folded inboard out of the way.

It will be seen that with the improved apparatus boats can be kept in the most convenient position for launching by the davits and tackle from both sides of the ship, or quickly transferred from one side of the ship to the other. The boats may also be easily loaded while in position on the trolleys before being swung outboard and lowered.

What I claim and desire to secure by Letters Patent is:—

1. In an apparatus of the class described a supporting frame, davits consisting of braced structures of right angled triangular form pivoted on said frame, pulleys carried by said davits and frame, falls for connecting a boat with a winch barrel guided over said pulleys, fall clamping means comprising angle levers pivoted to the davits, blocks carried by the davits, and springs connected to force said levers into engagement with said blocks between which the falls are arranged.

2. In an apparatus of the class described, a supporting frame, including davits consisting of braced structures of right-angled triangular form pivoted on said frame, pulleys carried by said davits and frame, falls for connecting a boat with a winch barrel guided over said pulleys, fall clamping means comprising angle levers pivoted to the davits, clamping jaws on said levers, blocks fixed to said davits, bolts passing through said blocks and jaws, and coiled springs on said bolts between said blocks and the bolt heads whereby said jaws are yieldingly held in engagement with said blocks.

3. In an apparatus of the class described, a supporting frame, including davits consisting of braced structures of right-angled triangular form pivoted on said frame, pulleys carried by said davits and frame, falls for connecting a boat with a winch barrel guided over said pulleys, fall clamping means comprising angle levers pivoted to the davits, clamping jaws on said levers, blocks fixed to said davits, bolts passing through said blocks and jaws, coiled springs on said bolts between said blocks and the bolt heads whereby said jaws are yieldingly held in engagement with said blocks, and stops on said frame arranged to engage and release said levers when the davits move to outboard position.

4. In an apparatus of the class described, a supporting frame, including davits consisting of braced structures of right-angled triangular form pivoted on said frame, pulleys carried by said davits and frame, falls for connecting a boat with a winch barrel guided over said pulleys, fall clamping means comprising angle levers pivoted to the davits, clamping jaws on said levers, blocks fixed to said davits, bolts passing through said blocks and jaws, coiled springs on said bolts between said blocks and the bolt heads whereby said jaws are yieldingly held in engagement with said blocks, stops on said frame arranged to engage and release said levers when the davits move to outboard position, foot levers, and cords connecting said foot levers and clamping levers to provide for the release of said clamping levers independently of the movement of the davits.

5. In an apparatus of the class described a supporting frame, including davits consisting of braced structures of right-angled triangular form pivoted on said frame, pulleys carried by said davits and frame, falls for connecting a boat with a winch barrel guided over said pulleys, and means on the davits for clamping said falls thereto when the davit moves in from the outboard position whereby the pull on the falls will be transferred to the davits to swing said davits to outboard position, and levers pivoted to said davits and engaging said frame to hold them in outboard position.

6. In an apparatus of the class described a supporting frame, including davits consisting of braced structures of right-angled triangular form pivoted on said frame, pulleys carried by said davits and frame, falls for connecting a boat with a winch barrel guided over said pulleys, and means on the davits for clamping said falls thereto when the davit moves in from the outboard position whereby the pull on the falls will be transferred to the davits to swing said davits to outboard position, tilting locking levers pivoted on said davits, and fixed stops on said frame positioned for engagement by said locking levers when the davits reach their outboard position for locking the davits against rising.

7. In an apparatus of the class described a supporting frame, including davits consisting of braced structures of right-angled triangular form pivoted on said frame, pulleys carried by said davits and frame, falls for connecting a boat with a winch barrel guided over said pulleys, and means on the davits for clamping said falls thereto when the davit moves in from the outboard position whereby the pull on the falls will be transferred to the davits to swing said davits to outboard position, tilting locking levers pivoted on said davits, and fixed stops on said frame positioned for engagement by said locking levers when the davits reach their outboard position for locking the davits against rising, and release means for said locking levers carried by said falls operable by the winding of the falls to a given height.

8. In a ship's boat launching apparatus foldable means for guiding the boats down the ship's side during the launching comprising a davit supporting frame, vertically disposed angular guide bars, links pivoted at one end to said frame and at their other end to said bars, said bars being spaced sufficiently to engage a boat at its stem and stern.

In testimony whereof I have affixed my signature, in presence of two witnesses.

ISAAC FRANCIS TAYLOR.

Witnesses:
S. WORK,
SAMUEL PERCIVAL.

Copies of this patent may be obtained for five cents each, by addressing the "Commissioner of Patents, Washington, D. C."